April 26, 1955          E. H. LAND          2,706,937

PHOTOGRAPHIC APPARATUS

Original Filed Oct. 14, 1948          2 Sheets-Sheet 1

INVENTOR
BY *Edwin H. Land*

*Brown and Mikulka*
ATTORNEYS

April 26, 1955

E. H. LAND 2,706,937

PHOTOGRAPHIC APPARATUS

Original Filed Oct. 14, 1948

INVENTOR
Edwin H. Land
BY Broward Mikulka
ATTORNEYS

United States Patent Office 2,706,937

Patented Apr. 26, 1955

2,706,937

PHOTOGRAPHIC APPARATUS

Edwin H. Land, Cambridge, Mass., assignor to Polaroid Corporation, Cambridge, Mass., a corporation of Delaware Original application October 14, 1948, Serial No. 54,496, now Patent No. 2,576,022, dated November 20, 1951. Divided and this application October 19, 1951, Serial No. 252,162

8 Claims. (Cl. 95—13)

This invention relates to photography and more particularly to novel photographic apparatus, such as a camera, wherein negative and positive images are preferably concurrently produced on negative and positive sheets by advancing the two sheets, in superposed relation and in conjunction with a processing liquid located therebetween, past a liquid-spreading means which spreads the liquid between the sheets. In such a camera, the thus processed sheets are preferably advanced from the liquid-spreading means into a chamber where formation of positive and negative images takes place in freedom from actinic light.

This application is a division of my copending application, Serial No. 54,496, filed on October 14, 1948, for Photographic Apparatus, now Patent No. 2,576,022, of November 20, 1951.

A principal object of the present invention is to provide improved photographic apparatus of the above type capable of use under extreme temperature conditions, such as would be encountered in special industrial or technical application, without impairing the quality of the photographic images obtained by the processing accomplished within such apparatus.

Another object of the present invention is to provide a photographic apparatus which comprises means defining the walls of a processing chamber into which negative and positive sheets may be advanced in superposed relation with a layer of processing liquid therebetween and means for enabling the introduction of heated gas to the processing chamber.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

A camera which may embody the herein disclosed invention is arranged for exposing and processing a photosensitive sheet which preferably includes a layer of a photosensitive silver halide. This processing is accomplished in conjunction with another sheet which is in superposed relation with said photosensitive sheet and in conjunction with a processing liquid which is located between the sheets when they are superposed. The camera includes means defining an exposure opening for exposing a predetermined area of the photosensitive sheet, this exposure opening being preferably associated with a usual lens and shutter. A portion of the camera defines a dry-processing chamber and other portions of the camera define a second chamber. The dry-processing chamber includes a pressure-applying means which preferably includes a pair of pressure members such as pressure rolls which act, without contacting the liquid, to spread this processing liquid between these two sheets, thus forming a sandwich of the two sheets as they pass into the second chamber. Within the second chamber the spread liquid accomplishes the desired processing, this processing comprising at least the development of the exposed photosensitive area and preferably including concurrent development of a negative image on the photosensitive sheet and a positive image on the second sheet. This second sheet will be hereinafter referred to as an image-carrying sheet.

The present invention is primarily concerned with improvements in cameras of the above type which facilitate obtaining good images despite extremely wide temperature variations encountered in the use of the camera. In the camera illustrated in Figs. 1 and 2, the second chamber includes at least one surface-defining wall and means are associated with this wall for maintaining the latter at a desired temperature. Means are also included in the camera for maintaining one of the sheets of the sandwich in heat-transferring relation to this wall. In a preferred construction of this second chamber two walls are provided, at least one of which is maintained at the desired temperature, and the walls are spaced apart by a distance not much greater than the thickness of the sandwich to be received therebetween. Thus, the second wall of the chamber acts as a means for supporting one of the sheets in heat-transferring relationship to the wall maintained at the desired temperature. These walls are preferably substantially planar and substantially parallel, thereby defining a substantially planar chamber which has a transverse dimension slightly larger than the width of the sandwich and a thickness on the order of the thickness of the sandwich.

Figure 1:
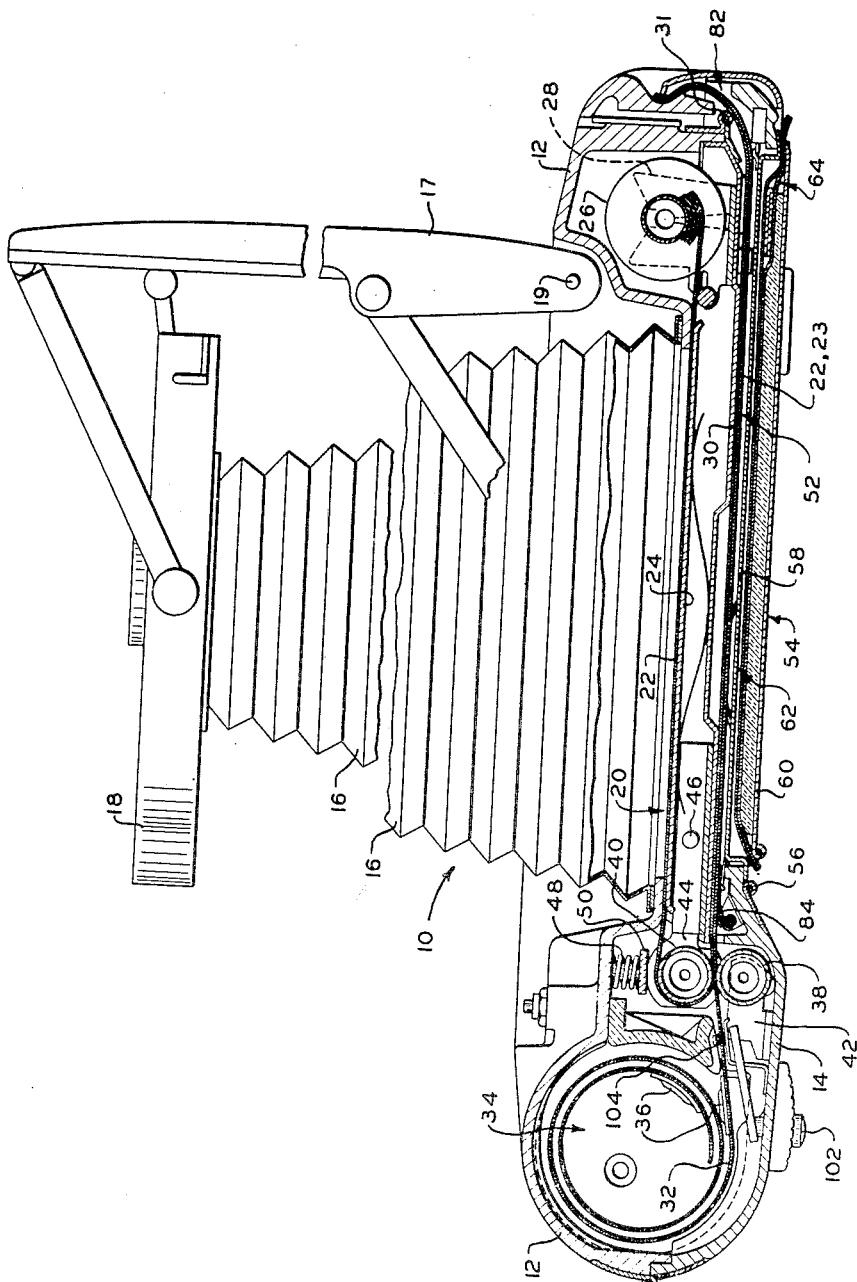
Figure 1 is a diagrammatic exaggerated fragmentary sectional view of one form of camera which may embody the present invention.
Figure 2:
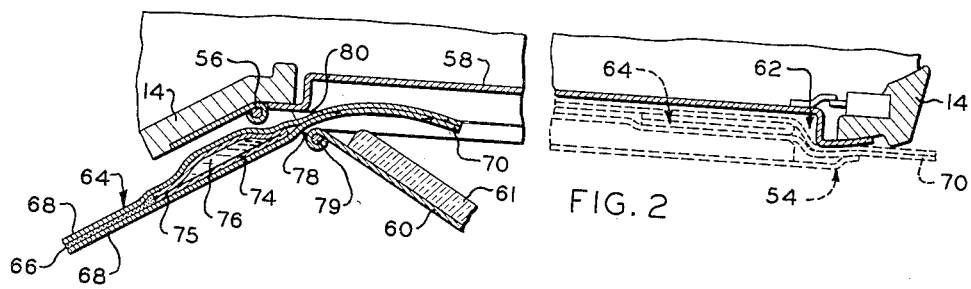
Fig. 2 is an enlarged fragmentary sectional view of a portion of Fig. 1.

For use in the camera of Figs. 1 and 2 the image-carrying sheet is composed of a plurality of separable image areas, these areas being defined by perforations substantially surrounding the areas to assist in separating the processed image from the sandwich. For providing access to the second chamber for removing the positive image area, a door is preferably included in one of the walls of the chamber, this door, in the illustrated form of the invention, comprising that wall of the chamber which is maintained at said predetermined temperature.

In these figures, camera 10 is shown as comprising a front housing 12 and a rear housing 14 connected thereto by a means such as a hinge 13. The front housing 12 carries a bellows 16 to which is connected a lens and shutter assembly schematically indicated at 18. For properly positioning the lens and shutter with respect to the front housing 12 there is provided a cover 17 pivoted to the front housing 12 as at 19. The front housing 12 also includes an exposure opening 20 behind which a photosensitive sheet 22 is adapted to be held in exposure position, within the focal plane of the camera, by means of a backing plate 24. For holding a spool 26, carrying the supply of the photosensitive sheet 22, there is included a spool holder 28 shown as being secured to a partition member 30 which extends between the two housings 12 and 14. Partition 30 is preferably hinged to front housing 12 at 31. For holding a supply of image-carrying sheet 32 there is provided a chamber 34 from which the image-carrying sheet can be fed into superposition with the photosensitive sheet 22 after exposure of the latter sheet. A plurality of containers 36 are shown as being secured at spaced intervals to a surface of the image-carrying sheet, each of these containers carrying a processing liquid, the containers being secured to that surface of the image-carrying sheet which is to be brought into superposition with the exposed photosensitive sheet.

For superpositioning the two sheets and for processing the two sheets by releasing the processing liquid from a container 36 and spreading this liquid between the two sheets 22 and 32, there is provided a pair of pressure rolls 38 and 40. Roll 38 is preferably secured, by means of a bracket 42, to rear housing 14, while pressure roll 40 is preferably carried by a pair of arms 44 secured, as at 46, to partition member 30. A pair of springs 48 and a pressure bar 50 apply a resilient load to rolls 38, 40 when these rolls are in the position shown in Fig. 1.

Figure 3:
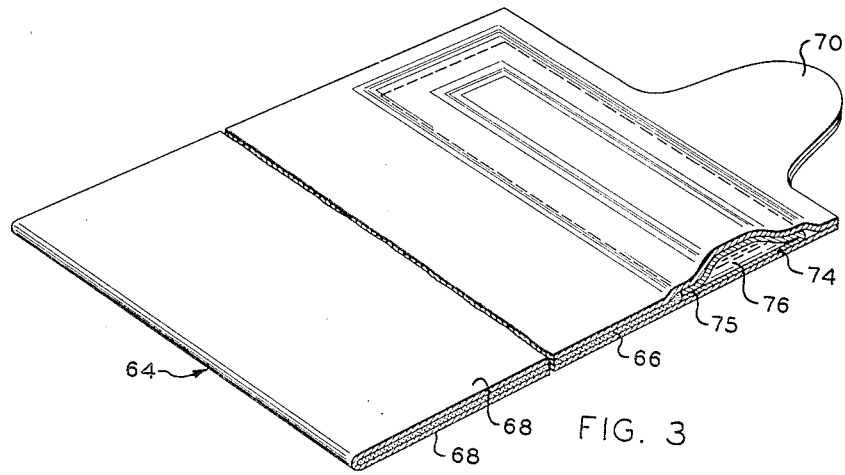
Fig. 3 is a diagrammatic fragmentary isometric view of a heating element particularly useful in the modification of the invention shown in Figs. 1 and 2.

The partition member 30 defines, with rear housing 14, a substantially planar chamber 52 into which passes the sandwich formed by laminating sheets 22 and 32 together by means of the layer of spread processing liquid. As can be seen, this chamber 52 is not much thicker than the thickness of the sandwich 22, 32 and has a transverse dimension slightly greater than the width of the sandwich 22, 32. This chamber is preferably sufficiently long to receive at least one processed image area. For providing access to a processed image area in chamber 52 there is included a door 54 in the rear housing 14, this door being hingedly connected to housing 14 as at 56. In a preferred form of construction an inner wall 58 of the door 54 is that surface of the chamber 52 which is maintained at a desired temperature. In a preferred form of the invention this wall 58 is heated in order to transfer heat to the layer of liquid in the sandwich 22, 32. An outer wall 60, of door 54, preferably cooperates with the inner wall 58 thereof to form a chamber 62 within the door for supporting a heating medium, generally indicated as a bag at 64, specific forms of the door and the bag being shown best in Figs. 2 and 3. The bag 64 preferably comprises a stratum 66 of material capable of entering into an exothermic reaction. The bag comprises outer walls 68 which are preferably moistureproof, these walls being sealed along the edges, and the ends of the walls being formed into a leader portion 70. Between the walls there is positioned the stratum 66, this stratum being shown, in a preferred form, as comprising a porous sheet, such as a blotter, confining the material to enter into the exothermic reaction. For providing a supply of water capable of creating an exothermic reaction with the material in stratum 66, there is included a collapsible container 74 having a rupturably sealed discharge mouth 75 and preferably carrying a predetermined quantity of viscous aqueous liquid 76. There is preferably sufficient water to thoroughly wet the stratum 66 so that the exothermic reaction will continue for a substantial period of time. This water may advantageously include a viscosity-increasing material such as sodium carboxymethyl cellulose.

As can be seen best in Fig. 2, the outer wall 60 of door 54 is pivotally connected to the remainder of the door by means of a hinge 79. This door is preferably provided with a pair of pressure-applying members adapted to release the liquid 76 from the container 74 and to spread this liquid across the surface of the stratum 66. In the preferred form illustrated, these pressure-applying members comprise a curved surface 78, associated with the hinge 79, which cooperates with a second curved surface 80, preferably carried by inner wall 58, these surfaces being spaced apart by a distance slightly greater than the thickness of the bag 64. A heat-insulating stratum 61 is preferably included as a part of the outer wall 60 of door 54 to prevent loss of heat to the atmosphere and also to prevent this outer wall from getting too hot to touch in those cases where the exothermic reaction generates a relatively high temperature.

A discharge opening 82 is provided at the right-hand end of the sandwich-receiving chamber 52 and a light-seal blade 84 is preferably provided at the left-hand end of the chamber 52 adjacent the pressure rolls 38 and 40. Suitable light seals and latches are provided for preventing fogging of the photosensitive sheet and for maintaining the various elementes of the camera in operative position.

When employing a preferred type of photochemical process in the above-described camera, the photosensitive sheet comprises a silver halide emulsion coated on a suitable base, the image-carrying sheet comprises baryta paper and the processing liquid includes an aqueous alkaline solution of a developer, a silver halide solvent and a film-forming material. The material entering into the exothermic reaction may comprise, for example, finely pulverized metals and other materials which readily oxidize when wetted with water. Examples of such materials are set forth in United States Patents 2,126,734 and 2,040,406. When extremely low temperatures are encountered one may use materials capable of entering into a highly exothermic reaction, such as those described in United States Patents 2,384,720 and 2,315,528.

In the use of the camera described in Figs. 1 and 2, the rear housing 14 is swung open, as is partition 30, these two members being swung around the hinge points 13 and 31 respectively. A spool 26 is placed in the spool holder 28, carried by the partition 30, and the leader portion of the photosensitive sheet 22 is led across back-ing plate 24, between the arms 44 and around the pressure roll 40. Partition 30 is then moved to the position shown in Fig. 1. A coil of image-carrying sheet 32 is placed in the chamber 34, the leader portion thereof is aligned with the leader for the photosensitive material and these two leaders are led along the back of the partition 30 till they extend beyond the right-hand end of the camera. The rear housing 14 is now moved to the position shown in Fig. 1, thereby making the interior of the camera light-tight.

The outer wall 60, of the rear door 54, is moved to the position shown in Fig. 2 and the leader portion 70, of the heating bag 64, is fed between curved pressure surfaces 78 and 80. This leader portion 70 is then grasped and the heating bag is pulled between the pressure surfaces 78 and 80. As the container 74 passes between these two surfaces, the hydraulic pressure in the viscous aqueous liquid 76 is increased to such an extent that the liquid is forced from mouth 75 and is spread in an even layer across the surface of the stratum 66 containing the material to enter into the exothermic reaction. Pulling of the heating bag 64 is continued until the liquid is spread substantially completely throughout the area of the bag 64. The outer wall 60 of the door 54 is then moved to the dotted line position of Fig. 2, the heating bag, with the liquid spread therein, thus occupying the chamber 62 between the inner wall 58 and the heat-insulating stratum 61 associated with the outer wall 60 of the door 54. Those portions of the two leaders, associated with sheets 22 and 32, extending from the right-hand end of the camera are then pulled to position an unexposed photosensitive area behind the exposure opening 20. This moving of the leaders positions a container, associated with a corresponding image area on the image-carrying sheet 32, so that the container is in advance of this area and is about to enter the bite of the pressure rolls. Exposure of the photosensitive area is now accomplished by suitably operating the shutter and the two leaders are then pulled to advance these layers in superposition between the pressure rolls 38 and 40. As these layers pass between these pressure rolls the processing liquid is released from the container and is spread in a uniform layer between the two sheets, thus forming a sandwich, this sandwich being advanced into the chamber 52 after formation. When the processing of the exposed area has been accomplished by spreading the processing liquid over the surface thereof, this exposed area resides in the chamber 52 and the sheet 32 is in heat-absorbing relation to the inner wall 58 of the door 54. Since this inner wall 58 is heated by the exothermic reaction in the heating bag 64, heat is transferred from the wall 58 to the sheet 32 and to the layer of spread processing liquid. This transferred heat maintains this layer of processing liquid at a sufficiently high temperature to accomplish the formation of both positive and negative images. At the end of a predetermined time, depending upon the degree of heat maintained in the processing liquid and the processing materials involved, the negative and positive images are completely formed and the door 54 may be opened to permit removal of that portion of the image-carrying sheet 32 containing the positive image. Removal of this area is preferably aided by having this area surrounded by perforations made in the sheet at the time of manufacture thereof.

The preferred form of the present invention speeds up the development of the positive and negative images and permits the use of such a processing camera regardless of the temperatures encountered in the use of the camera. It permits the use of processing materials, and amounts thereof, which give optimum images from the viewpoint of color, definition, tone and stability.

When a material is used which generates sufficient heat to cause the formation of steam, the steam may be discharged to the outside of the camera by supplying a suitable vent. In the alternative, the steam may be allowed to pass into the sandwich-receiving chamber to aid in the heating of the sandwich and also to wet the sandwich by condensation of the steam thereon. In either such case the chamber which holds the heating bag may be provided with a means for perforating the outer walls 68 of the bag to permit the escape of the generated steam. When the steam is discharged into the camera care must be taken to isolate the steam-filled area from the camera lens to prevent condensation on the lens.

Figure 4:
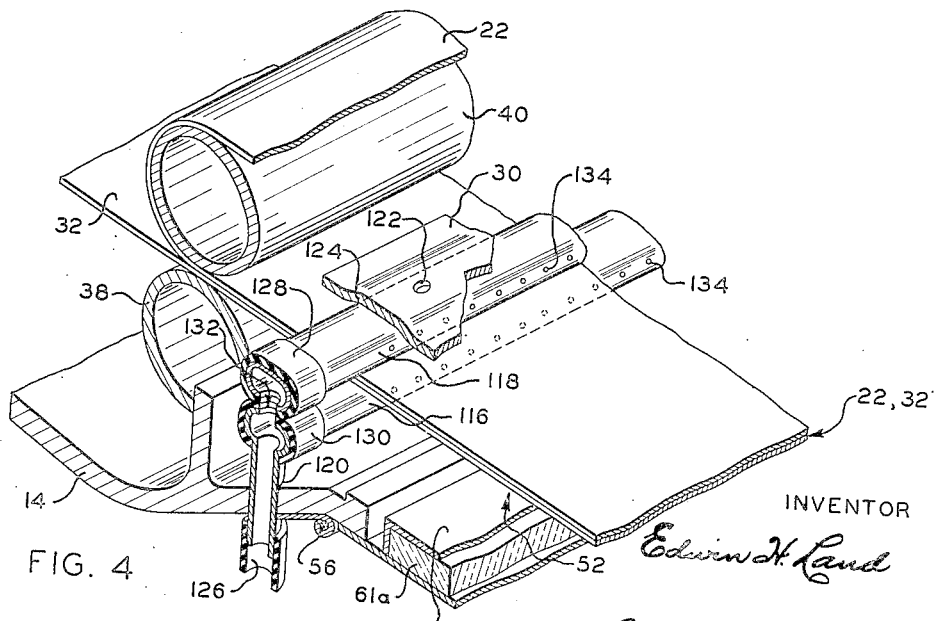
Fig. 4 is a diagrammatic fragmentary sectional view of a preferred form of the invention herein disclosed as embodied in a camera of the type shown in Fig. 1.

The camera illustrated in Figs. 1 and 2 includes means for introducing a heating fluid into the camera body and distributing the fluid in a layer in heat-transferring relationship to a sandwich positioned within chamber 52. In accordance with the present invention, means for introducing a heated gas, such as air, into chamber 52 are substituted for the heating fluid introducing means shown in Figs. 1 and 2. An example of such heated gas-introducing means is shown in Fig. 4, wherein like numerals refer to like elements in the preceding figures. As seen in Fig. 4, the light-seal blade 84 is preferably omitted from the camera of Figs. 1 and 2 and the space previously occupied thereby contains a heated gas discharge means comprising a pair of manifolds 116 and 118. The lower manifold 116 is suitably mounted on the rear housing 14 such as by means of a fitting 120 which may also serve as the gas inlet to the manifolds. Upper manifold 118 is preferably secured to partition 30 by means such as a screw 122, the partition 30 being slightly recessed as at 124 to accommodate the manifold 118. Fitting 120 is preferably connected to a tube 126 which extends outside of the camera. The left-hand ends of the two manifolds include a gas pressure seal means shown as a pair of gasket members 128 and 130. A passage 132 permits gas entering the camera to be distributed between the two manifolds. Each manifold has a plurality of gas-discharge orifices 134 distributed along its length so that the gas emanating from the manifolds may pass on both sides of the sandwich 22, 32. In a preferred embodiment of the above invention the door 54 includes an insulating stratum 61a which prevents transfer of heat between the interior and exterior of the camera. In this case the partition 30 is also preferably made of insulating material or covered by a layer of such material.

In the use of the embodiment of Fig. 4, the rear housing 14 is opened, thus separating manifold 116 from manifold 118. The partition 30 is then moved to open position, the negative spool is placed in the spool holder and the negative leader is led around roll 40 and into the position shown in Fig. 4. The positive sheet 32 is placed in the camera, aligned with negative sheet 22, and the rear housing is closed, thus moving the sealing gasket 130 into operative relationship with sealing gasket 128 and sealing the edges of passage 132. The negative is next exposed and then is formed into the processing sandwich as previously described, this sandwich being advanced into the chamber 52 after formation. In a preferred method of using the temperature-controlling means of Fig. 4, the camera user inserts the outer end of tube 126 into his mouth and blows into the tube. The manifolds 116 and 118 distribute the user's relatively hot breath on both sides of the sandwich 22, 32, this hot breath passing along the outer surfaces of the sandwich until the right-hand end of the camera is reached. The excess breath may be conveniently discharged through the opening 82 at the right-hand end of the camera. The layer of breath on both sides of the sandwich has two important functions. In the first place it heats the sandwich, and secondly it provides an atmosphere of very high humidity to prevent evaporation of the water from the sandwich and may, in fact, even add water by condensation on the sandwich. When the user's breath is employed as the heated gas it is preferred that the seal around the exposure opening of the camera be sufficiently tight to prevent this breath from entering the camera bellows and condensing on the inner surface of the camera lens.

With regard to the pressure-applying rolls 38 and 40 for spreading the processing liquid for processing the photosensitive sheet, numerous alternative embodiments of these rolls are feasible within the scope of the invention. As one example thereof, the spreading surfaces for the photochemical processing liquid may comprise a platelike element, such as a flat surface on partition 30, and a roller which is mounted for movement from one end of chamber 52 to the other end thereof, this roller releasing and spreading the processing liquid between two sheets held in stationary superposed relation in chamber 52.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera apparatus in which a photosensitive sheet is exposed and thereafter processed, the combination of a housing which defines an exposure chamber wherein a frame of said photosensitive sheet may be exposed, a portion of said housing defining an opening to said exposure chamber, a pair of pressure-applying members for forming a sandwich by superposing said photosensitive sheet on another sheet and spreading a processing liquid between said sheets, an inner closure member pivoted to said housing at one side of said opening for substantially closing said opening, an outer closure member pivoted to another side of said opening for forming with said inner closure member a processing chamber that is adapted to receive a sandwich formed by said pressure-applying members, one of said pressure-applying members being mounted on said inner closure member, the other of said pressure-applying members being mounted on said outer closure member, and a pair of discharge means for spreading a heated gas on both sides of a sandwich positioned in said processing chamber, one of said discharge means being mounted on said inner closure member and the other of said discharge means being mounted on said outer closure member.

2. In a camera apparatus in which a photosensitive sheet is exposed and thereafter processed, the combination of a housing which defines an exposure chamber wherein a frame of said photosensitive sheet may be exposed, a portion of said housing defining an opening to said exposure chamber, a pair of pressure-applying members for forming a sandwich by superposing said photosensitive sheet on another sheet and spreading a processing liquid between said sheets, an inner closure member pivoted to said housing at one side of said opening for substantially closing said opening, an outer closure member pivoted to another side of said opening for forming with said inner closure member a processing chamber that is adapted to receive a sandwich formed by said pressure-applying members, one of said pressure-applying members being mounted on said inner closure member, the other of said pressure-applying members being mounted on said outer closure member, a pair of manifolds for spreading a heated gas on both sides of a sandwich positioned in said processing chamber, one manifold being mounted on said inner closure member and the other manifold being mounted on said outer closure member, each of said manifolds being provided with a vent, said vents being adapted to be aligned to provide a passage from said one manifold to said other manifold, gasket means for sealing said passage when said vents are aligned, and means providing a passage from said other manifold through said outer closure member for permitting the introduction of heated gas into said processing chamber.

3. A photographic apparatus comprising a pair of pressure-applying members for superposing an exposed photosensitive sheet and another sheet and spreading a processing composition therebetween to form a sandwich, a pair of closely adjacent superposed walls defining a processing chamber an end of which is adjacent to said pressure-applying members for receiving said sandwich, and an elongated gas discharge manifold extending substantially from one edge of said chamber to the opposite edge thereof, said manifold having communicating orifice means extending therealong substantially from one edge thereof to the opposite edge thereof whereby said manifold is capable of distributing warm air along said sandwich from one edge thereof to the opposite edge thereof.

4. A photographic apparatus comprising a pair of pressure-applying members for superposing an exposed photosensitive sheet and another sheet and spreading a processing composition therebetween to form a sandwich, a pair of closely adjacent superposed walls defining a processing chamber an end of which is adjacent to said pressure-applying members for receiving said sandwich, a first manifold within said chamber on one side of said sandwich, and a second manifold within said chamber on the other side of said sandwich, each of said first and second manifolds having orifice means extending therealong substantially from one edge of said sandwich to the opposite edge thereof, said first and second manifolds being adapted to distribute warm gas simultaneously on opposite sides of said sandwich.

5. A photographic apparatus comprising a pair of pressure-applying members for superposing an exposed photosensitive sheet and another sheet and spreading a processing composition therebetween to form a sandwich, a pair of closely adjacent superposed walls defining a processing chamber an end of which is adjacent to said pressure-applying members for receiving said sandwich, a first elongated manifold within said chamber having communicating orifice means extending substantially from one edge of said chamber to the opposite edge thereof, and a second elongated manifold within said chamber having communicating orifice means extending substantially from one edge of said chamber to the opposite edge thereof, said first and second manifolds being aligned on opposite sides of said sandwich, said manifolds providing communicating openings, said manifolds being adapted to distribute streams of warm gas simultaneously on opposite sides of said sandwich.

6. A photographic apparatus for processing an exposed photosensitive sheet, said apparatus comprising a first wall and a second wall, said walls being pivotable with respect to each other into predetermined relative positions, a pair of pressure-applying members, one member of said pair being mounted on said first wall, the other member of said pair being mounted on said second wall, said members defining a pressure-applying region through which a photosensitive sheet can advance when said walls are in said predetermined relative positions, said walls when in said predetermined relative positions defining a processing chamber into which said photosensitive sheet can advance from said pressure-applying region, a manifold secured to one of said walls, said manifold being located within said processing chamber when said walls are in said predetermined relative positions, a fitting providing a passage from said manifold through one of said walls, and a tube one end of which is free to be inserted into the mouth of an operator whereby the breath of the operator may be introduced into said processing chamber.

7. A photographic apparatus for processing an exposed photosensitive sheet, said apparatus comprising a first wall and a second wall, said walls being pivotable with respect to each other into predetermined relative positions, a pair of pressure-applying members, one member of said pair being mounted on said first wall, the other member of said pair being mounted on said second wall, said members defining a pressure-applying region through which a photosensitive sheet can advance when said walls are in said predetermined relative positions, said walls when in said predetermined relative positions defining a processing chamber into which said photosensitive sheet can advance from said pressure-applying region, a manifold secured to one of said walls, said manifold being located within said processing chamber when said walls are in said predetermined relative positions, and a fitting providing a passage through the other of said walls, said fitting being connected to said manifold when said walls are in said predetermined relative positions.

8. A photographic apparatus for processing an exposed photosensitive sheet, said apparatus comprising a first wall and a second wall, said walls being pivotable with respect to each other into predetermined relative positions, a pair of pressure-applying members, one member of said pair being mounted on said first wall, the other member of said pair being mounted on said second wall, said members defining a pressure-applying region through which a photosensitive sheet can advance when said walls are in said predetermined relative positions, said walls when in said predetermined relative positions defining a processing chamber into which said photosensitive sheet can advance from said pressure-applying region, a first manifold secured to said first wall, a second manifold secured to said second wall, said first and second manifolds being located within and on opposite sides of said processing chamber when said walls are in said predetermined relative positions, and a fitting providing a passage from said second manifold through said second wall, said manifolds being operatively connected when said walls are in said predetermined relative positions whereby warm air introduced through said fitting is ejected from both said first manifold and said second manifold on opposite sides of a photosensitive sheet located within said processing chamber.

References Cited in the file of this patent
UNITED STATES PATENTS

| | | |
|---|---|---|
| 1,424,816 | Grillone | Aug. 8, 1922 |
| 1,494,203 | Wolfe | May 13, 1924 |
| 1,728,361 | Pifer | Sept. 17, 1929 |
| 2,446,668 | Tuttle | Aug. 10, 1948 |